(12) United States Patent
Vorontcov et al.

(10) Patent No.: US 9,600,579 B2
(45) Date of Patent: Mar. 21, 2017

(54) PRESENTING SEARCH RESULTS FOR AN INTERNET SEARCH REQUEST

(71) Applicant: YANDEX EUROPE AG, Lucerne (CH)

(72) Inventors: Iurii Vitalievich Vorontcov, Saint-Petersburg (RU); Denis Olegovich Ivanov, Saint Petersburg (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 14/916,921

(22) PCT Filed: Jan. 6, 2015

(86) PCT No.: PCT/IB2015/050099
§ 371 (c)(1),
(2) Date: Mar. 4, 2016

(87) PCT Pub. No.: WO2016/001766
PCT Pub. Date: Jan. 7, 2016

(65) Prior Publication Data
US 2016/0232236 A1    Aug. 11, 2016

(30) Foreign Application Priority Data
Jun. 30, 2014   (RU) ................................ 2014126762

(51) Int. Cl.
*G06F 17/30*   (2006.01)
*G06F 3/0484*   (2013.01)
(Continued)

(52) U.S. Cl.
CPC ...... *G06F 17/30864* (2013.01); *G06F 3/0484* (2013.01); *G06F 17/2235* (2013.01);
(Continued)

(58) Field of Classification Search
CPC .................. G06F 17/30864; G06F 17/30867
(Continued)

(56) References Cited

U.S. PATENT DOCUMENTS 6,044,480 A * 3/2000 Keen .................... H04L 1/242
                                                       714/712
6,721,736 B1   4/2004 Krug et al.
(Continued)

FOREIGN PATENT DOCUMENTS

RU         2487404 C2     7/2013
WO      2012119246 A1     9/2012

OTHER PUBLICATIONS

International Search Report from PCT/IB2015/050099, Jun. 4, 2015, Shane Thomas.
(Continued)

*Primary Examiner* — Shahid Alam
(74) *Attorney, Agent, or Firm* — BCF LLP

(57) ABSTRACT

There is disclosed a method of constructing a search engine result page. The method comprises receiving from the client device via the communications network, a search request, effecting a search in respect of the search request to yield search results, the search results including at least one webpage, analyzing the at least one webpage for detecting a repeating pattern of information, using the repeating pattern of information, retrieving at least one non-repeating data segment from within the at least one webpage, generating the search engine result page, the search engine result page including the at least one non-repeating data segment, sending a command signal to the client device via the communications network, the command signal being instrumental in causing the client device to execute and displaying, to the user via a user interface of the client device, (i) the search results including a link to at least one webpage and (ii) for at least one webpage, the non-repeating data segment in close proximity to the link.

18 Claims, 9 Drawing Sheets

(51) Int. Cl.
*G06F 17/22* (2006.01)
*H04L 29/08* (2006.01)

(52) U.S. Cl.
CPC .... *G06F 17/2247* (2013.01); *G06F 17/30696* (2013.01); *G06F 17/30867* (2013.01); *H04L 67/02* (2013.01)

(58) Field of Classification Search
USPC ........................................................ 707/706
See application file for complete search history.

(56) References Cited

U.S. PATENT DOCUMENTS

| | | | |
|---|---|---|---|
| 8,326,830 | B2 | 12/2012 | Hollingsworth |
| 8,396,849 | B2 | 3/2013 | Sauve et al. |
| 8,479,118 | B2 | 7/2013 | Lyndersay et al. |
| 2004/0114808 | A1* | 6/2004 | Rothman .............. G06F 8/4436 382/232 |
| 2005/0114317 | A1 | 5/2005 | Bhide et al. |
| 2007/0050201 | A1 | 3/2007 | Gardner et al. |
| 2008/0162401 | A1 | 7/2008 | Shelton et al. |
| 2009/0125529 | A1 | 5/2009 | Vydiswaran et al. |
| 2009/0216748 | A1 | 8/2009 | Kravcik |
| 2010/0005095 | A1 | 1/2010 | Yun et al. |
| 2010/0114925 | A1 | 5/2010 | Shafer et al. |
| 2013/0191723 | A1 | 7/2013 | Pappas et al. |

OTHER PUBLICATIONS

International Preliminary Report on Patentability from PCT/IB2015/050099, Nov. 2, 2015, Shahid Alam.

Ageev et al., Extracting meaningful information of web-pages for problems information retrieval, translated with https://translate.googleusercontent.com/translate_f on Nov. 29, 2016, 18 pages.

* cited by examiner

PRESENTING SEARCH RESULTS FOR AN INTERNET SEARCH REQUEST

CROSS-REFERENCE

The present application claims priority to Russian Patent Application No. 2014126762, filed Jun. 30, 2014, entitled "METHOD OF PRESENTING SEARCH RESULTS IN RESPECT OF AN INTERNET SEARCH REQUEST" the entirety of which is incorporated herein.

FIELD

The present technology relates to a method and system of presenting search results in respect of Internet search queries.

BACKGROUND

The internet provides a simple and low-cost solution for publishing various types of documents and information. From scientific papers, legal decisions, job offers to products and services, the possibilities are endless. However, finding the information sought is not always simple and straightforward.

Searches on the Internet are performed through a search engine. Keywords relevant to the information sought are entered by a user in the search engine. The keywords entered are used as search criteria by the search engine as a search request (also sometimes referred to as a "search query"). The search engine identifies from tables (such as index tables, inverted tables, crawlers, etc.) webpages corresponding to the search criteria. The search engine then takes snapshots (if not recently performed) of each webpage of interest. The webpages of interest are rated by the search engine based on relevancy, and presented to the user in a Search Engine Result Page(s) (SERP) in order of relevancy. The SERP usually includes the following fields for each webpage or information available through a webpage of interest identified: title, a Uniform Resource Locator (URL) address, and a description which may include a snippet of the first occurrence of the keywords on the webpage, or metadata published by the webpage owner.

Although the current presentation of identified webpages of interest is adequate for presenting some types of Internet search results, such structure is not convenient for others. For example, for websites which include many records of interest, such as classified advertisement websites, the information displayed on the SERP is insufficient for the user to determine whether the search results correspond to the information sought. The user must thus access the webpage to evaluate whether its content is of interest.

SUMMARY

It is an object of the present technology to ameliorate at least some of the inconveniences present in the prior art.

According to the first broad aspect of the present technology, there is provided a method of constructing a search engine result page, the method executable at a server in communication with an electronic device via a communications network. The method comprises receiving a search request from the electronic device via the communications network, effecting a search in respect of the search request to yield search results, the search results including at least one webpage, analyzing the at least one webpage for detecting a repeating pattern of information, retrieving at least one non-repeating data segment from within the at least one webpage using the repeating pattern of information, generating the search engine result page, the search engine result page including the at least one non-repeating data segment, sending a command signal to the electronic device via the communications network, the command signal being instrumental in causing the electronic device to execute and displaying to the user via a user interface of the electronic device, (i) the search results including a link to at least one webpage and (ii) for at least one webpage, the non-repeating data segment in close proximity to the link.

In some implementations of the method, said retrieving at least one non-repeating data segment from within the at least one webpage comprises using the repeating pattern of information, retrieving a plurality of non-repeating data segments from within the at least one webpage, each of the plurality of non-repeating data segments being at least partially different from others of the plurality of non-repeating data segments.

In some implementations of the method, the repeating pattern of information includes a repeating pattern of coding elements defining a coding template.

In some implementations of the method, the method further comprises storing information representative of a structure of the coding template in a data store accessible to the server.

In some implementations of the method, analyzing the at least one webpage by the server to detect a repeating pattern of information within the at least one webpage and storing information representative of a structure of the coding template in a data store accessible to the server occur prior to receiving the search request from the electronic device via the communications network and generating the search engine result page.

In some implementations of the method, the command signal is further instrumental in causing the electronic device to display the search results, whereby the non-repeating pattern data segment replaces at least a portion of a description of the at least one webpage.

In some implementations of the method, generating the search engine results page includes ranking the search results by a ranking algorithm, the ranking algorithm assigning a higher ranking to the at least one webpage associated with a detected repeating pattern of elements.

In some implementations of the method, the non-repeating data segment being non-repeating data segments, the method further comprises receiving from the electronic device a filter request to filter the non-repeating data segments according to at least a portion of the non-repeating data for at least one webpage having a detected repeating pattern of elements, effecting a second search in respect of the search request and the filter to yield second search results, the second search results including only those non-repeating data segments meeting the filter request, generating a second search engine result page by the server and sending the second search engine result page to the electronic device.

In some implementations of the method, the method further comprises, for a plurality of webpages having a detected repeating pattern of elements wherein the plurality of webpages contain a common type of non-repeating data segments, receiving a filter request from the electronic device to filter the non-repeating data segments according to at least a portion of the non-repeating data, effecting a second search in respect of the search request and the filter to yield second search results by the server, the second search results including only those non-repeating data segments meeting the filter request, generating a second search engine result page by the server and sending the second search engine result page to the electronic device.

In some implementations of the method, the non-repeating data segment includes pricing information.

In some implementations of the method, the non-repeating data segment includes images.

In some implementations of the method, the method further comprises receiving a client pull request for the non-repeating data segments from the electronic device via the communications network and sending some of the non-repeating data segments of the at least one webpage to the electronic device.

According to another broad aspect of the present technology, there is provided a method of constructing a search engine result page viewable by a user of an electronic device, executable by the electronic device in communication with a server via a communication network. The method comprises receiving, from the user via a user interface of the electronic device, a search request, sending the search request to the server, receiving from the server, a search engine result page including search results in respect of the search request, the search results including at least one webpage having a repeating pattern of information within that webpage and at least one non-repeating data segment retrieved using the repeating pattern of information and displaying, to the user via the user interface, a list of links to at least some webpages being part of the search results, and, for the at least one webpage having the repeating pattern of elements, at least one non-repeating data segment of the at least one webpage, in proximity to the link to the at least one webpage.

In some implementations of the method, said retrieving at least one non-repeating data segment from within the at least one webpage comprises using the repeating pattern of information, retrieving a plurality of non-repeating data segments from within the at least one webpage, each of the plurality of non-repeating data segments being at least partially different from others of the plurality of non-repeating data segments.

In some implementations of the method, the method further comprises receiving, from the user via the user interface, a filter request to filter the non-repeating data segments according to at least a portion of the non-repeating data, sending the filter request to the server, receiving, from the server, a second search engine result page including the non-repeating data segments corresponding to the filter request and displaying, to the user via the user interface, the second search engine result page.

In some implementations of the method, the filter request is in respect of multiple webpages, each of the multiple webpages having a detected repeating pattern of elements and having non-repeating data segments having a common type of non-repeating data, sending the filter request to a host server hosting a one of the multiple webpages and receiving, from the host server hosting the one of the multiple webpages, non-repeating data segments corresponding to the filter request.

In some implementations of the method, the non-repeating data includes pricing information.

In some implementations of the method, the non-repeating data includes images.

In some implementations of the method, the method further comprises sending a client pull request for at least one non-repeating data segment to a host server hosting the at least one webpage and receiving, from the host server hosting the at least one webpage, the at least one non-repeating data segment of the at least one webpage.

According to another broad aspect of the present technology, there is provided an electronic device comprising: a user input interface for receiving user inputs, a user output interface for providing at least one of visual and audible outputs to the user, a network communication interface for two-way communication over a communication network and a processor coupled to the user input interface, the user output interface and the network communication interface. The processor is configured to have access to computer readable commands which commands, when executed, cause the processor to: receive a search request from the user via the user input interface, send the search request to a server via the communication network, receive a search engine result page including search results in respect of the search request from the server, the search results including at least one webpage having a repeating pattern of information within that webpage and at least one non-repeating data segment retrieved using the repeating pattern of information and display, to the user via the user output interface, a list of links to at least some webpages being part of the search results, and, for the at least one webpage having the repeating pattern of elements, at least one non-repeating data segment of the at least one webpage, in proximity to the link to the at least one webpage.

In some implementations of the device, the processor is further configured to receive a filter request to filter the non-repeating data segments according to at least a portion of the non-repeating data from the user via the user input interface, send the filter request to the server, receive a second search engine result page including the non-repeating data segments corresponding to the filter request from the server and display to the user via the user output interface, the second search engine result page.

In some implementations of the device, wherein the filter request is in respect of multiple webpages, each of the multiple webpages having a detected repeating pattern of elements and having non-repeating data segments having a common type of non-repeating data, the processor is further configured to: send the filter request to a host server hosting a one of the multiple webpages and receive non-repeating data segments corresponding to the filter request from the host server hosting the one of the multiple webpages.

In some implementations of the device, the processor being further configured to send a client pull request for at least one non-repeating data segment to a host server hosting the at least one webpage and receive, from the host server hosting the at least one webpage, the at least one non-repeating data segment of the at least one webpage.

According to another broad aspect of the present technology, there is provided a server comprising: a communication interface for communication with an electronic device via a communication network and a processor operationally connected with the communication interface. The processor is configured to receive a search request from the electronic device via the communication network, effect a search in respect of the search request to yield search results, the search results including at least one webpage, analyze the at least one webpage for detecting a repeating pattern of information, using the repeating pattern of information, retrieve at least one non-repeating data segment from within the at least one webpage, generate the search engine result page, the search engine result page including the at least one non-repeating data segment, send a command signal to the electronic device via the communications network, the command signal being instrumental in causing the electronic device to execute and display, to the user via a user output interface of the electronic device, (i) the search results including a link to at least one webpage and (ii) for at least one webpage, the non-repeating data segment in close proximity to the link.

In some implementations of the server, the repeating pattern of information includes a repeating pattern of coding elements defining a coding template.

In some implementations of the server, the processor is further configured to store information representative of a structure of the coding template in a data store accessible to the server.

In some implementations of the server, the processor is further configured such that analyzing the at least one webpage by the server for detecting a repeating pattern of information within the at least one webpage and storing information representative of a structure of the coding template in a data store accessible to the server occur prior to receiving from the electronic device via the communications network, the search request, and generating the search engine result page.

In some implementations of the server, wherein to generate the search engine results page, the processor is operable to rank the search results by a ranking algorithm, the ranking algorithm assigning a higher ranking to the at least one webpage associated with a detected repeating pattern of elements.

In some implementations of the server, wherein the non-repeating data segment is non-repeating data segments, the server is further configured to receive from the electronic device a filter request to filter the non-repeating data segments according to at least a portion of the non-repeating data for at least one webpage having a detected repeating pattern of elements, effect a second search in respect of the search request and the filter to yield second search results, the second search results including only those non-repeating data segments meeting the filter request, generate a second search engine result page by the server and send the second search engine result page to the electronic device.

In some implementations of the server, the processor is further configured to, wherein the plurality of webpages contain a common type of non-repeating data segments, receive a filter request from the electronic device to filter the non-repeating data segments according to at least a portion of the non-repeating data for a plurality of webpages having a detected repeating pattern of elements, effect a second search in respect of the search request and the filter to yield second search results by the server, the second search results including only those non-repeating data segments meeting the filter request, generate a second search engine result page by the server and send the second search engine result page to the electronic device.

In some implementations of the server, the processor is further configured to receive a client pull request for the non-repeating data segments from the electronic device via the communications network and send some of the non-repeating data segments of the at least one webpage to the electronic device.

In the context of the present specification, a "server" is a combination of computer program running on appropriate hardware, capable of receiving requests (e.g. from client devices) over a network, and carrying out those requests, or causing those requests to be carried out. The hardware may be one or several physical computers or one or several physical computer systems. In the present context, the use of the expression a "server" is not intended to mean that every task (e.g. received instructions or requests) or any particular task is received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "search engine server".

In the context of the present specification, "client device" or "electronic device" is any electronic device that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that an electronic device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the electronic hardware on which the data is stored, implemented or otherwise rendered available for use. A database may reside on the same hardware as the process that stores or makes use of the information stored in the database or it may reside on separate hardware, such as a dedicated server or plurality of servers, memory banks and the like.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) and hardware capable of executing the instructions of the software, that are both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present detailed description is intended to be only a description of illustrative examples of the present technology. This description is not intended to define the scope or set forth the bounds of the present technology. In some cases, helpful examples of modifications may be set forth as an aid to understanding the present technology, and not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that particular aspect of the present technology. As a person skilled in the art would understand, this is likely not the case. In addition it is to be understood that present detailed description provides in certain instances simple implementations of the present technology, and that where such is the case they have been presented in this manner as an aid to understanding. As persons skilled in the art would understand, various implementations of the present technology may be of a greater complexity.

Figure 1:
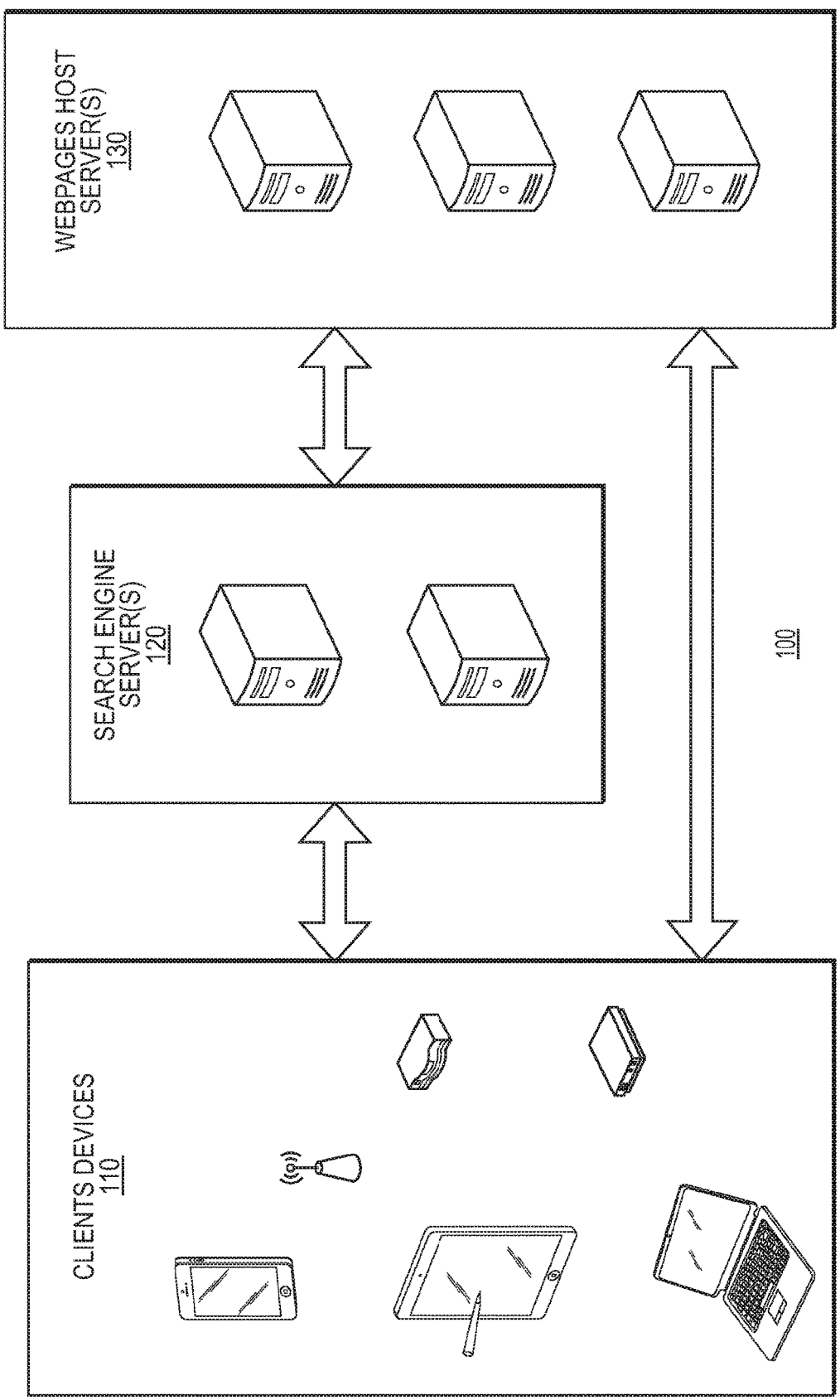
FIG. 1 is simplified schematic representation of an Internet network with client devices, search engine servers and webpage host servers.

Referring to FIG. 1, a simplified schematic representation of an Internet network 100 is presented. For simplicity purposes, and for the sake of the present description, the Internet network 100 is depicted with only three categories of nodes, namely client devices 110, search engine servers 120 and webpage host servers 130, a client device being an electronic device utilized by the user of the system and method, as previously described. However, those skilled in the art will recognize that the Internet network 100 includes many more categories of node, and in which category of nodes, multiple types of equipment could be used. Each category of nodes may communicate with the other categories of nodes, in accordance with established protocols and standards.

Various types of client or electronic devices 110 may be used in the context of the present technology. For example, the client device 110 may be a smart phone, a tablet, a laptop, a computer, a television, a game console, or any other type of client device which is adapted for, and capable of, accessing the Internet network 100. The client device 110 may access the Internet network 100 directly, or through an extranet server, a Wi-Fi access point, an Internet service provide, a cellular service provider, etc.

To conduct an Internet search, a user of the client device 110 opens a web browser application, and may select a search engine application. In some implementations, the search engine functionality is configured to automatically provide access to a specific search engine application, while in other implementations, a list of search engine applications, or a random search engine application is provided. The user of the client or electronic device 110 then enters the keyword(s) corresponding to the information searched. The keywords may further be grouped or separated by Boolean expressions recognized by the search engine application. The keyword(s) and the Boolean expressions, if used, form a search request sent to the search engine server as a search request.

The search request is sent by the client device 110 to the search engine server 120. The search engine server 120 may include one or multiple servers receiving search queries, conducting search queries, and providing search engine results page in parallel or in sub-groups for multiple client devices.

Figure 2:
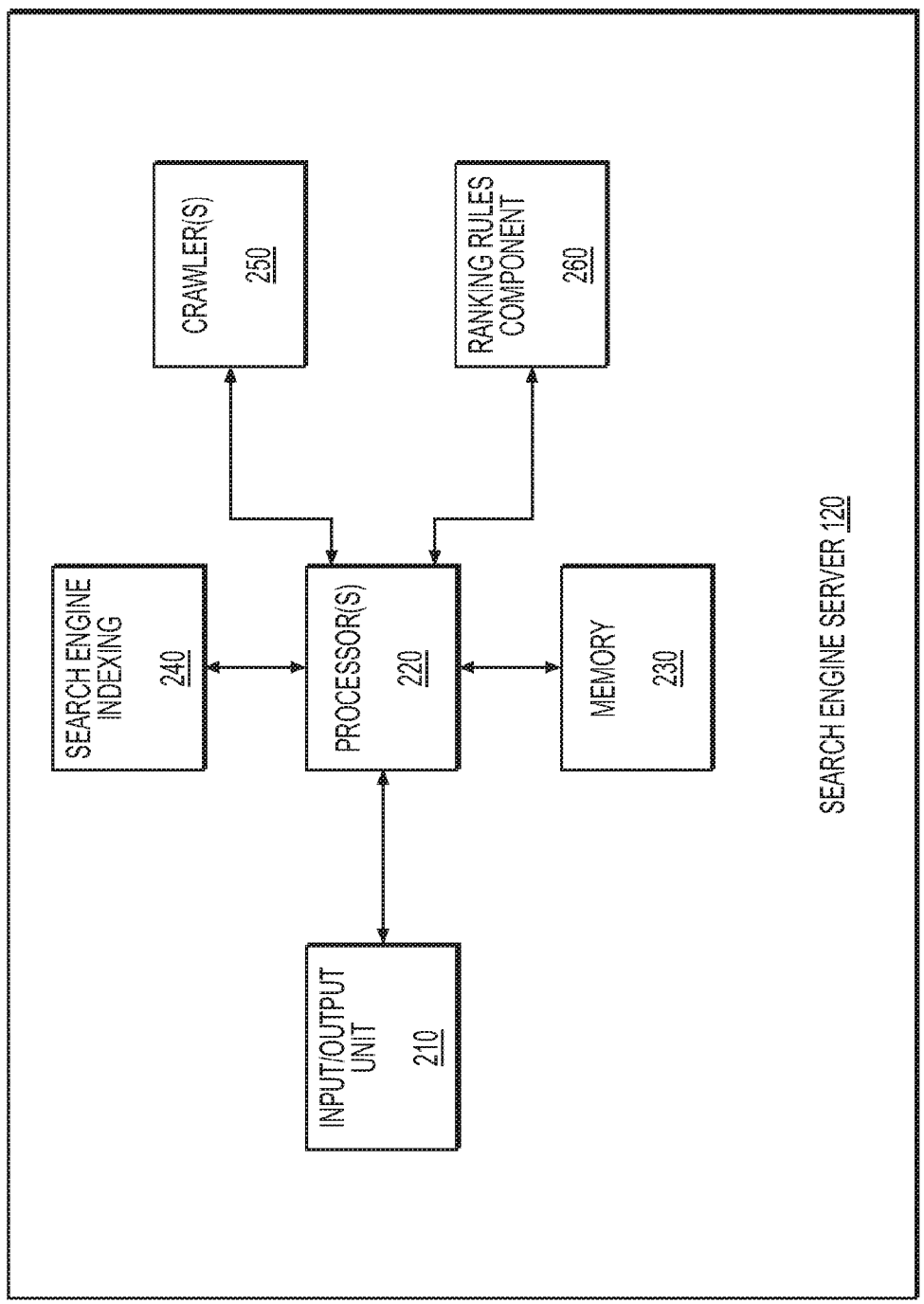
FIG. 2 is a simplified schematic block diagram of functional components of a search engine server.

Referring now to FIG. 2, a simplified schematic block diagram of functional components of a search engine server 120 is presented. The functional components of the search engine server 120 shown in FIG. 2 are for exemplary purposes only and do not depict all functional components of the search engine server 120, neither all the variants of functional components which may be arranged differently (sub-divided, grouped), and/or provided in multiple instances, etc. Thus for the sake of the present description, only the basic functional components of the search engine server 120 are shown and described. The search engine server 120 includes an input/output unit 210, processor(s) 220, memory 230, search engine indexing 240, crawler(s) 250 and a ranking rules component 260.

The input/output unit 210 enables communication between the search engine server 120 and the client device 110, and with webpages host servers 130 (shown in FIG. 1) and with other network nodes and servers (not shown). The input/output unit 210 is adapted to communicate in accordance with protocols and standards known and used for communications over the Internet. The input/output unit 210 receives the search queries, and provides the search queries to the processor 220. The input/output unit 210 may further be capable of receiving other types of requests and generating other types of responses not related to the present technology, and therefore not discussed.

As search engine servers 120 are usually network nodes capable of simultaneously handling thousands of search queries from various client devices, multiple processors 220 are typically used. However, for simplicity purposes, the following description will use the expression 'the processor 220', which is meant to refer to the processor functionality and related hardware of the search engine server 120.

The processor 220 has access to the memory 230, which typically consists of large memory banks Although not specifically depicted in FIG. 2, the memory 230 may be used by a single search engine server 120, or may be shared amongst a plurality of groups and/or sub-groups of search engine servers 120. The memory 230 stores snapshots of webpages available on the Internet, snapshots which were previously taken by the search engine server 120 as part of an automated crawling activity or in the context of effecting a previous Internet search. The memory 230 may further include a corresponding webpage Uniform Resource Locator (URL) address for each of the snapshot, along with an indication as to when the snapshot was taken. The memory 230 could further store other information for each webpage such as for example metadata and HTML tags, as known in the art.

The processor 220 also has access to the search engine indexing 240. The search engine indexing 240 collects and indexes information and webpages from the Internet. The search engine indexing 240 may be located locally within the search engine server 120, or remotely. Alternately, the search engine indexing 240 can be provided by the search engine server 120, or provided by another supplier. The search engine indexing 240 provides fast and accurate retrieval of information stored and available on the internet. Various types of indexing methods may be used by the search engine indexing 240, such as for example the well-known inverted index structure.

The processor 220 also communicates with one or a plurality of crawler(s) 250. Each crawler 250 is used to visit websites and then index each to the memory 230 and the search engine indexing 240. Before a search is undertaken by the search engine server 120, each crawler 250 may take a snapshot (electronic copy) of the webpages and index the webpages visited, snapshots being processed by the search engine indexing 240. The crawler(s) 250 can also be used for validating URL addresses, metadata and HTML tags of visited webpages. The website indexing having been carried out before the receipt of a search request and having been stored in the search engine indexing 240, the search engine server 120 then consults the search engine indexing 240 to retrieve search results that correspond to the search request from the user.

The processor 220 also cooperates with a ranking rules component 260. The ranking rules component 260 stores and applies rules for ranking specific relevance of each webpage corresponding to the search request received. The ranking rules component 260 may take into consideration many factors, such as for example: trust, links from other webpages, relevance, anchor text information, number of outbound links, page context, domain age, page maturity, link freshness, distance from homepage, etc.

Figure 3:
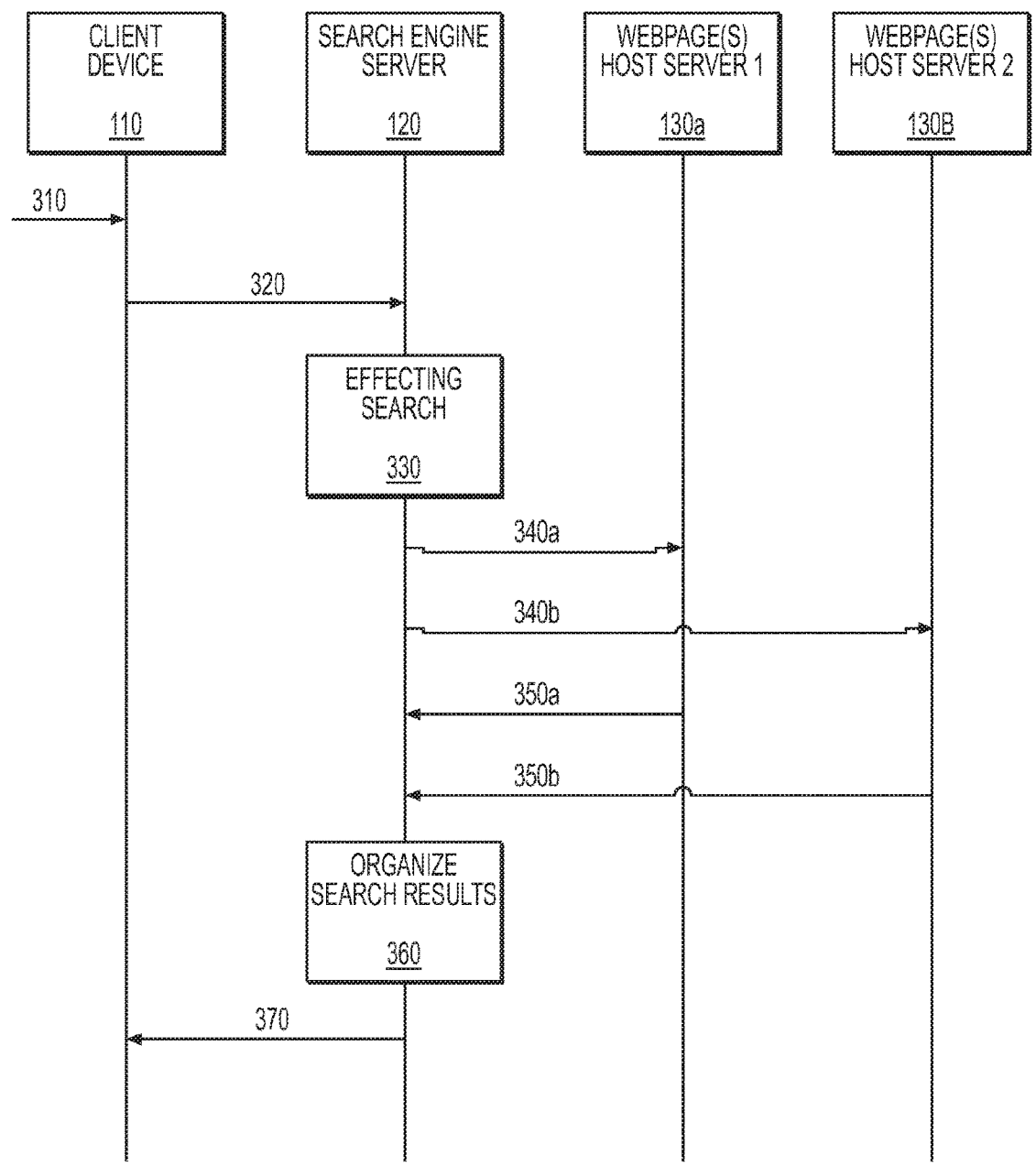
FIG. 3 is a signal sequence diagram of the present method of presenting search results in respect of an Internet search request.

Referring now to FIG. 3, a signal sequence diagram of the present method of displaying search results in respect of an Internet search request is shown. The method starts by a user entering a search request in 310. Typically, the search request includes keyword(s), and sometimes Boolean expression(s) between some of the keywords. The client device 110 forwards 320 the search request to the search engine server 120. For doing so, the client device 110 bundles the search request in an Internet Protocol message sent to the search engine server 120 over the Internet network as a search request. The search engine server 120 receives the Internet Protocol message as known in the art, and extracts therefrom the search request. The search engine server 120 than effects the internet search 330 to identify webpage indexes corresponding to the search request, as known in the art and previously briefly described. During the course of effecting the search 330, the search engine server 120 accesses 340a and 340b webpage(s) host server 130a and 130b respectively. Although only two webpage(s) host server are depicted and discussed in FIG. 3, the present technology is not limited to two webpage(s) host server, as the search engine server 120 is capable of accessing as many webpage(s) host server as required to effect the Internet search for the received search request. Each of the accessed webpage(s) host server 130a and 130b returns 350a and 350b an index of the webpage(s) hosted thereby and corresponding to the keywords of the search request. Then, the search engine server 120 organizes 360 the search results 360 to generate a Search Engine Results Page (SERP) in response to the search request. Organizing the search results 360 may include ranking the search results, extracting from the HTML information and metadata for the webpage title and occurrence of the keywords for generating snippet information for the webpage in the SERP. The search results, formatted as a SERP are sent 370 to the client device for display on the client device 110.

Figure 4:
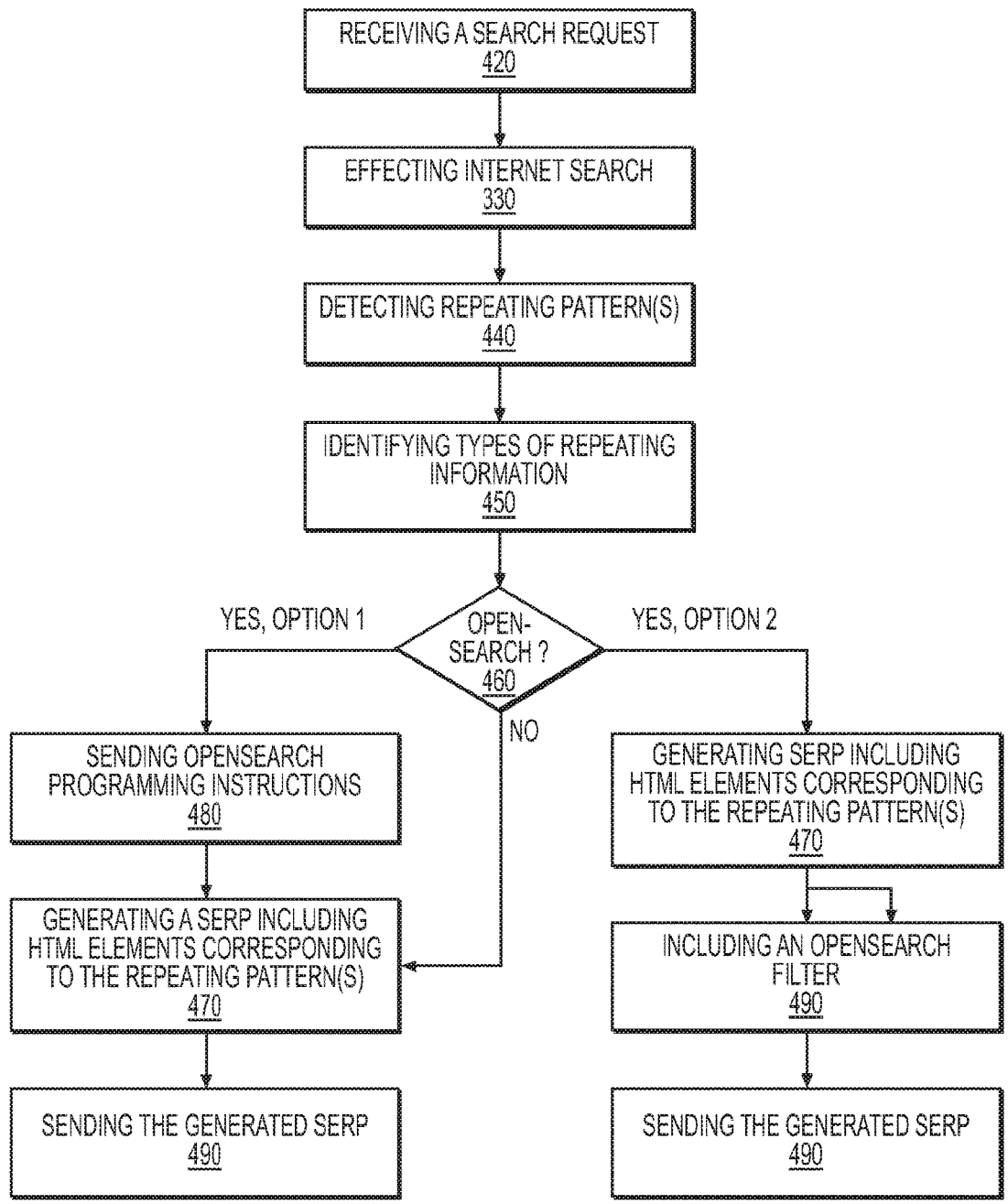
FIG. 4 is a flow diagram of an aspect of the present method of presenting search results in respect of an Internet search request.
Figure 5:
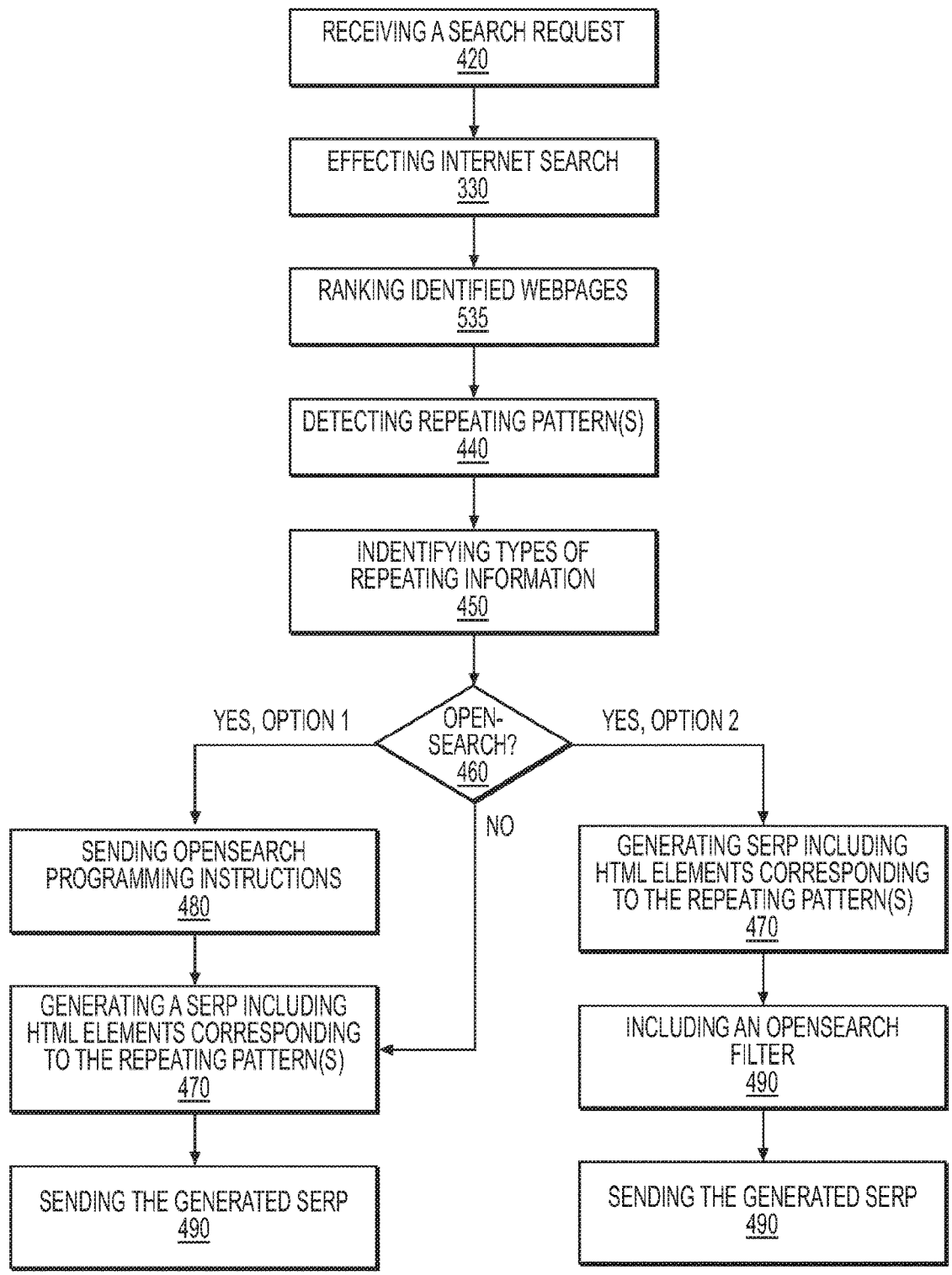
FIG. 5 is a flow diagram of another aspect of the present method of presenting search results in respect of an Internet search request.

Reference is now made concurrently to FIGS. 3, 4 and 5, where FIGS. 4 and 5 are flow diagrams of aspects of the present technology of presenting internet search results. In FIG. 4, the method includes receiving a search request by the search engine server 120 from the client device 110. The search request includes a search request as entered by the user, which may include keyword(s) and may also include Boolean expressions as previously discussed. As known in the art, the message that encapsulates the search request also includes source and destination addresses, to ensure that the search request message is delivered to the search engine server 120, and that the search engine server 120 has the address of the client device 110 to return the search results.

Upon receipt of the search request 420, the search engine server 120 effects the Internet Search 330. Webpages typically include different information such as for example: images, headlines, body content, navigation, metadata and/or microformat, and credits, which will have been indexed by the crawlers at an earlier point in time. The search engine server 120 searches the search engine indexing 240 for results that correspond to the query found within the search request 420. The webpages identified by the search engine server 120 as corresponding to the search request, including the keywords, form the search results. The search engine server 120 extracts basic information from the webpages forming the search results to generate the Search Engine Result Page (SERP). Typically, the search engine server 120 extracts for each identified webpage its URL address, the first occurrence of the keywords in the webpage, the title of the webpage, and the domain related to the webpage. The search engine server 120 may additionally extract standardised metadata to be displayed as snippet information in SERPs. Thus effecting the internet search 330 includes identifying the webpages corresponding to the search request and the keywords, and extracting therefrom the information to generate the resulting SERP.

In an implementation depicted in FIG. 5, the method further ranks 535 the webpages identified in the search results by order of specific relevance, as known in the art, before continuing further.

In the present technology, the method further comprises identifying 440 one or several repeating pattern(s) of information in the content of at least one of the webpage identified in the search results. Detection of the repeating patterns of information may take place before the search request is received by the search engine server 120. Alternatively, detection of the repeating patterns of information may take place after the search request is received by the search engine server 120.

Repeating pattern(s) of information are often present on webpages which correspond to database search results, such as for example classified advertisement websites, SERP of other search engines, retail websites, and many other types of applications. For example, when the search engine server 120 effects the internet search using keywords which are present in classified advertisements, the classified advertisement website will provide to the search engine server 120 with the webpage content, within which a list of entries describing items for sale (for-sale entries) which may correspond to the search request or keywords.

These for-sale entries may be organized or, otherwise, present a repeating pattern of information. The repeating pattern of information may be defined by, for example HTML tags or coding that is structured to present: an image, description, price, current geographical location of the object, seller, etc. As there are several for-sale entries that may be presented on any given web page, the several for-sale entries may be organized in the same (or substantially the same way), thus creating the repeating pattern of information.

It should be expressly understood that the repeating pattern of information may be present in many formats, including any type of HTML format or type, such as for example in titles, body element, metadata, as well as in any other known format for generating webpages.

Having identified one or more types of repeating patterns of information, the method further retrieves any non-repeating data segments using the repeating patterns of information. For example, a repeating pattern of code for presenting a price within a classified advertisement may be detected and the non-repeating data segments retrieved therefrom would be the different prices for different for-sale entries.

The method and search engine server 120 may detect a different repeating pattern or pattern(s) on different webpages. A repeating pattern of information for presenting price may by found on one website, while a repeating pattern of information on another website may consist of HTML coding for presenting images. Alternately, the method and search engine server 120 may identify a repeating pattern in the content of one of the highly ranked webpage, and search for the same repeating pattern in the content of the other webpages. The method and the processor of the search engine server 120 may further be configured to identify repeating pattern(s) only for some specific domain names and/or URL addresses. Alternately, the method and the search engine server 120 may be configured to identify repeating pattern(s) on only the highly ranked identified webpages.

In one aspect of the present technology, the retrieval of the non-repeating data segments can be done automatically when a first search request is entered in a search request 420 and presented on a first SERP. Alternatively in another aspect, the search engine server 120 may be configured to identify repeating pattern(s) of identified webpages only after they have first been displayed page of the SERP and a subsequent request for the SERP to include results presenting non-repeating data segments has been received from the user. The user request may be received in response to the user clicking (or otherwise actuating) a graphical element associated with either the SERP or the browser displaying the SERP, the graphical element being indicative to the user of the presence of possibility for extracting and presenting on SERP the non-repeating data segments associated with one or more search results presented on the SERP.

Optionally, the method and search engine server 120 may further identify the type(s) of non-repeating data segments to be retrieved from a page or pages containing repeating patterns of information. For example, when the method and/or search engine server 120 identifies(y) a repeating pattern in the HTML content of a webpage corresponding to classified ads, the non-repeating data segments that may typically be retrieved therefrom include an image and a price.

The method and search engine server 120 may then analyze other webpages identified by the internet search, to detect whether the non-repeating data segment types that may be retrieved from the repeating patterns of information present match the desired types, such as images and prices. While not an exhaustive list, examples of the types of non-repeating data segments that users may desire to be retrieved include: picture, price, location, description, title, keyword, rating or seller. Furthermore, the method and search engine server 120 could detect on different webpages identified during the internet search, repeating patterns of information which are similar but are not identical. The method and search engine server 120 may then limit the type of repeating pattern of information or type of non-repeating data segment considered for all identified webpages based on some commonality.

The method and search engine server 120 could alternately limit the detection and retrieval of the non-repeating data segments to the type identified in the highest ranked webpage. For example, if the highest ranking webpage is a classified advertisement page displaying non-repeating data segments of the price and image types, the non-repeating data segments retrieved from other search results would be limited to the price and image types as well.

Other methods and mechanisms of rendering uniform and/or extracting valuable information from the repeating patterns of information and non-repeating data segments found within the content of the webpages could also be used, without departing from the present technology.

The method may further, in some implementations of the present technology, include a function of providing a filtering capability for the information displayed within the SERP. One of the embodiments of a filter capability used may use OpenSearch technology. However, it should be expressly understood that other technologies can be used for implementing the filter capability described herein.

Using the example of the OpenSearch technology as an illustration only, the method verifies 460 whether one of the webpages identified by the internet search 330 supports the OpenSearch technology. If none of the webpages identified by the internet search supports OpenSearch technology, the method pursues with generating 470 the SERP. If one of the webpages identified supports the OpenSearch technology, the method may either proceed with option 1 or with option 2. In option 1, the method sends 480 OpenSearch programming instructions, which when executed by a processor of the client device, provides a filter. In option 2, the method first generates 470 the SERP, in which an OpenSearch filter is included 490. The functioning of the OpenSearch filter will be discussed further.

Reference is now concurrently made to FIGS. 2-6. The method and search engine server 120 generate 470 the SERP. The SERP, of which a schematic example is provided in FIG. 6 includes information about the webpages identified with respect to the search request 420. The information about the webpages identified may include any type of information known in the art, such as for example: a title of the webpage, a URL address of the webpage, a domain name for the webpage, metadata of interest, and a snippet of information including the first occurrence of the keywords of the search on the webpage.

Figure 6:
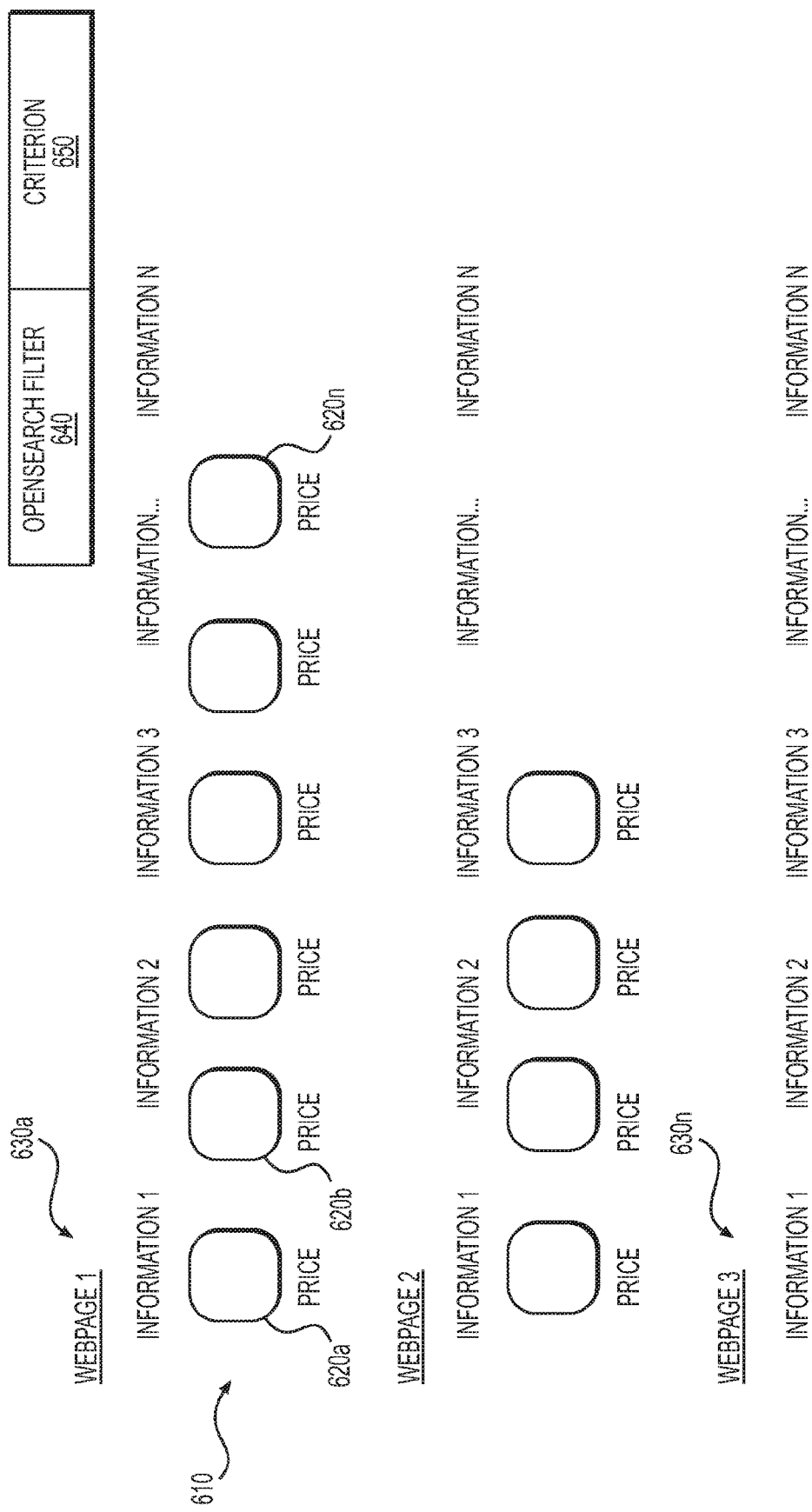
FIG. 6 is an exemplary schematic representation of a SERP in accordance with the present method and system.

The present SERP of FIG. 6 further includes a presentation of multiple non-repeating data segments 610 as retrieved from detected repeating patterns of information on the webpage identified in the webpage link 630*a*. In FIG. 6, the non-repeating data segments 610 happen to be prices and images retrieved using the repeating pattern of elements, with each "Price" corresponding to a different image 620*a* . . . *n*.

In the case of a classified advertisement webpage for example, these groupings of price and image non-repeating data segments would have been retrieved from different for-sale entries. The different groupings of the non-repeating data segments of 610, e.g. the prices and images for different for-sale entries on a classified advertisement page, may be formatted to be displayed on a display of the client device in any of the following ways: next to the corresponding webpage, as snippet information of the corresponding webpage or grouped with HTML coding corresponding to the type of non-repeating data segment in a section of the SERP.

The non-repeating data segment groupings 610 could also be formatted to be displayed on a display of the client device as a line, a column or grouped on the SERP (to the left, to the right, at the bottom, at the top). The non-repeating data segments 610 may also be displayed in place of the webpage description, rather than in addition to the description. The SERP is then sent 490 to the client device for display. In some implementations, the retrieval of the non-repeating data segments is done automatically while effecting a first search request. In some implementations, a user may request detection of the non-repeating data segments by sending a request to the server to do so.

By displaying the non-repeating data segments 610 in groupings corresponding to their grouping on the webpage 630*a* . . . *n* (such as for-sale entries), the user of the client device can quickly identify the information of interest. FIG. 6 depicts one example of how the non-repeating data segment groupings 610 with the different "Prices" and images 620*a* . . . 620*n* may be displayed on the SERP. Many other graphical display arrangement of the non-repeating data segment groupings 610 could be contemplated: in one or several lines, in one or several columns, in a table, located to the left of the corresponding webpage information, located to the right of the corresponding webpage information, presented as snippet information of the corresponding webpage, grouped together in one location of the SERP or in some other configuration.

Although FIG. 6 shows a certain grouping of non-repeating data segments 610, that grouping containing images 620*a* . . . 620*n* and the corresponding prices as the non-repeating data segments retrieved using the repeating pattern of information, any combination of types of non-repeating data segments could be displayed. Furthermore, the type of non-repeating data segments could be different for each webpage 630*a* . . . 630*n* displaying non-repeating data segments on the SERP.

FIG. 6 further displays the filter 640. The filter 640 provided and displayed in the SERP allows the user who receives the SERP on the client device 110 to filter further the results provided in the SERP. The filtering may be performed in any of the following manner: a) filter by the non-repeating data segments (for example, filtering by price or returning only results containing images); b) filter the displayed webpages 630*a* . . . 630*n*; and/or c) effect a new internet search of webpages corresponding to the a search request or keywords while meeting a filtering criterion 650 provided by the user of the client device on the SERP.

Figure 7:
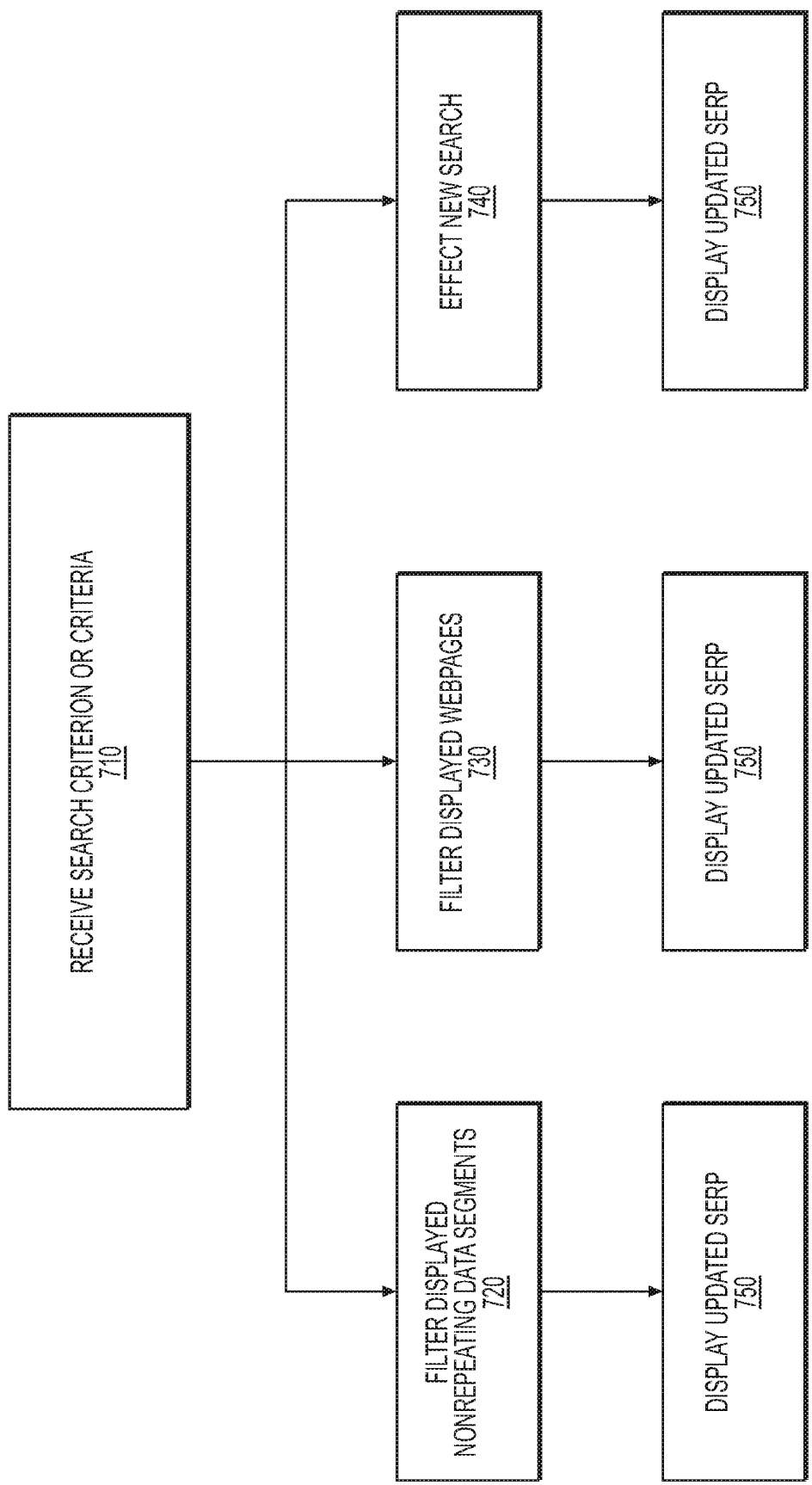
FIG. 7 is a flow diagram of the present method and search engine server filtering of search results that may be provided in the SERP.

Reference is now made concurrently to FIGS. 6 and 7. Filtering of the SERP is performed upon entering a criterion 650 by the user of the client device. The criterion 650 may be entered using any known electronic inputting device, such as for example a keyboard, a mouse, a touchscreen display, voice activation, etc.

In some implementations, the filter 640 may include a scroll down menu of the available fields for further filtering the results of the SERP. In some implementations, the filter capability may be provided by OpenSearch technology. For example, the scroll down menu could be created using OpenSearchable fields identified in the webpages included in the SERP. In another alternative, the scroll down menu could be composed of the type of non-repeating data segment the user desires to be filtered in the current SERP or in a new search. The scroll down menu could alternatively be created using standard types of information that may compose the non-repeating data segments, such as for example: price and location. The filter, for example an OpenSearch filter 640, could also be provided as a fixed parameter, such as for example price or a range of prices. The criterion 650 may be entered as free text, or by means of a scroll down menu.

Depending on the implementation of the present filter 640 in the SERP, the method may continue by filtering 720 the non-repeating data segments 610 displayed on the current SERP so as to only display the non-repeating data segments meeting the criterion 650. Alternately and/or concurrently, the method may filter 730 the webpages displayed in the SERP to only include the webpages which meet the criterion 650.

The filtering 720 of the non-repeating data segments and the filtering 730 of the displayed webpages could be performed directly by a processor of the client device. Alternately, the filtering 720 of the non-repeating data segments and the filtering 730 of the displayed webpages can be performed by the search engine server. Alternatively, the method could effect a new search 740 to retrieve webpages and non-repeating data segments that meet the criteria 650 entered by the user in the filter, effecting a combined search and filtering.

Figure 8:
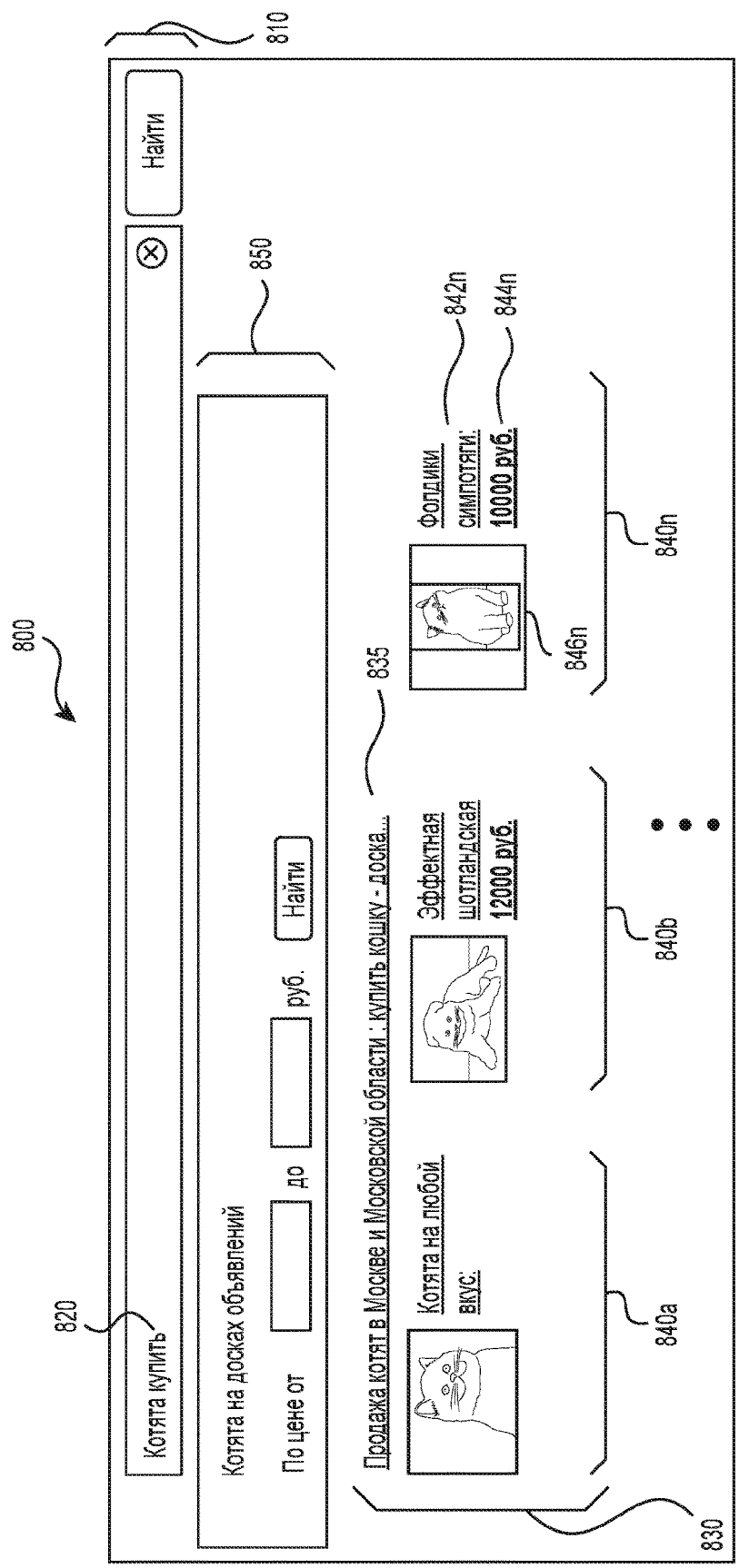
FIG. 8 is an example of the output of one implementation of the present technology, where a SERP presents the results of a search for kittens for sale augmented with non-repeating data segments, including an implementation of a price filter.

Referring now to FIG. 8, an exemplary output of one implementation of the present technology is displayed. A partial screenshot 800 of an exemplary SERP is shown, where a search is carried out in the search bar 810 for the search request phrase 820 "buy kitten". The first search result displayed in this example is a webpage result 830, composed of a webpage link 835 and, in place of the website description or snippet, non-repeating data segment groupings 840a . . . n. While only a first result 830 is displayed, further results could include webpage links with non-repeating data segments of either a single type or in groups, as shown in the first result in FIG. 8. It should be noted that other results presented within the SERP may include the associated non-repeating data segments or may be presented with snippets, the URL or descriptions, as known in the art.

In this example, the implementation of the present technology has detected a repeating pattern of information using which non-repeating data segments can be retrieved. As depicted below the link to the webpage result 835, in this case three types of non-repeating data segments were retrieved using the repeating pattern of information, specifically the title 842n, the image 846n and the price 844n of each of the groups shown for the first search result. If these non-repeating data segments were found on a classified advertisement website, for example, the SERP is directly displaying the title and picture from three different for-sale entries for kittens for sale on that webpage linked to by webpage link 835. Additionally, a price was found for elements 840b and 840n, although not for element 840a.

For the example of finding the non-repeating data segments on a classified advertisement website, this could mean that one kitten for sale was listed without a selling price. On the SERP, the non-repeating data segments of title 842a . . . n, image 846a . . . n and price 844b . . . n determined from the repeating pattern of information are grouped together, such that the non-repeating data specific to each entry on the original website can be identified by the user.

For the kitten for sale in elements 840b and 840n, the user can compare the kittens' relative cuteness and price without leaving the SERP. Additionally, the user can tell from the SERP if the search result 830 found by the search engine server 120 of interest to the user for further exploration by clicking on the webpage link 835. In some embodiments, the user can even satisfy her search need by simply appreciating the information in elements 840b and 840n (and other elements of the search result 830), without actually having to visit the associated web site associated with the search result 830.

In addition to results returned on the SERP in this example, a filter 850 is implemented on the SERP to allow the user to refine the search results according to a portion of the non-repeating data segments. In this example, the user can apply a filter on the range of prices of kittens for sale. When the user then activates the filter, an updated SERP would be returned, with only the elements corresponding to the filter request being presented. In this example, only the kittens for sale with prices within the filter range entered in the filter 850 will be returned on the updated SERP.

Figure 9:
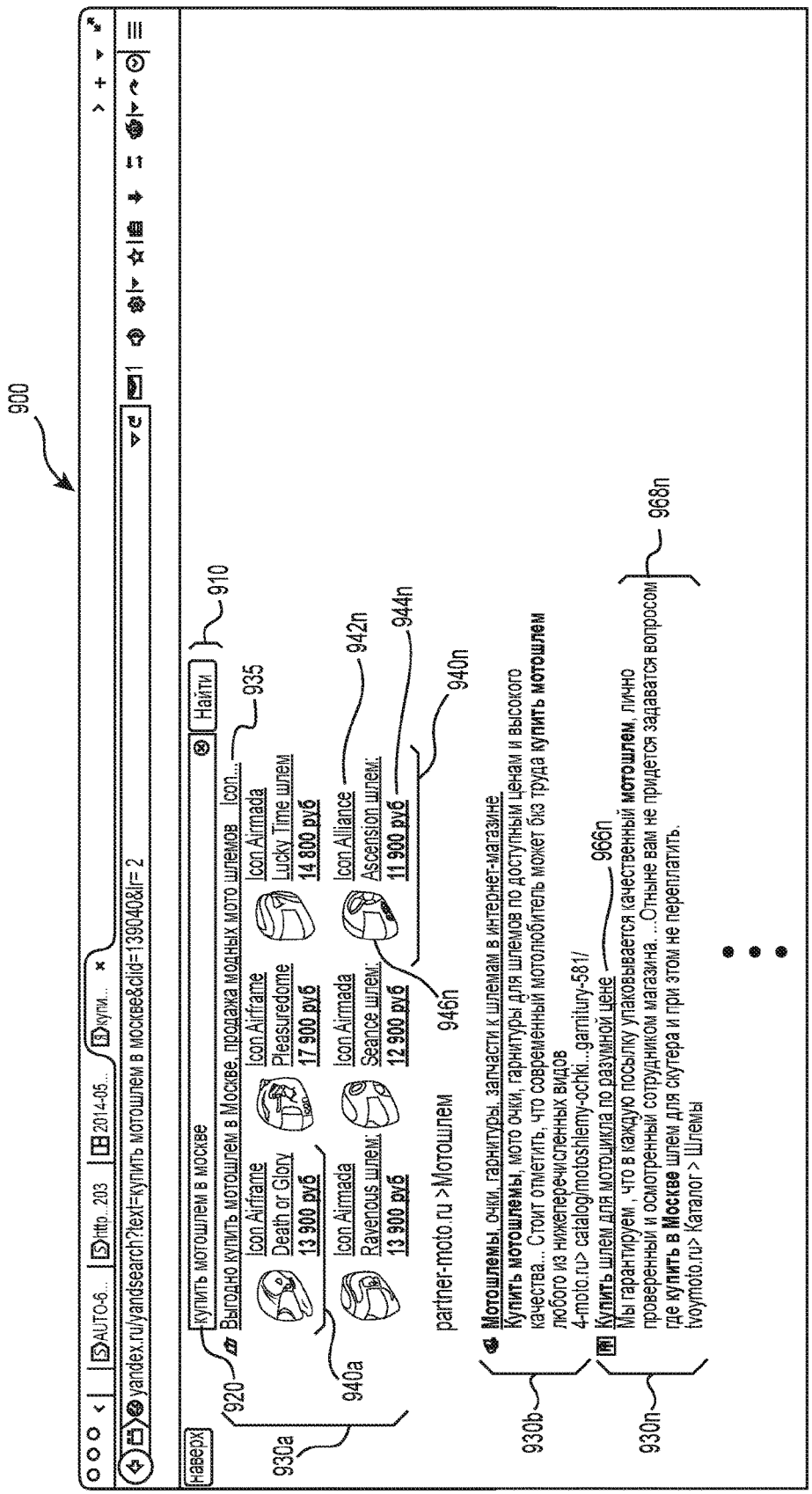
FIG. 9 is an example of the output of another implementation of the present technology, where a SERP for a search for helmets for sale in Moscow is presented, again augmented with the non-repeating data segments found using a recognized repeating pattern as described in the embodiments.

Referring now to FIG. 9, an exemplary output of another implementation of the present technology is displayed. A partial screenshot 900 of a SERP created using an implementation of the present technology is shown, where a search is carried out in the search bar 910 for the search request phrase 920 "buy a motorcycle helmet in Moscow".

The first search result displayed in this example is the webpage result 930a, composed of the webpage link 935 and non-repeating data segment groupings 940a . . . n as retrieved from an identified repeating pattern of information. The groupings 940a . . . n are displayed here in place of a webpage snippet or description.

For this first search result 930a, the implementation has detected repeating patterns of information and using this, retrieved non-repeating data segments of types title 942n, picture 946n and price 944n. For each grouping 940n, the three types of non-repeating data segments are again displayed together corresponding to their groupings on webpage 930a. In this case, allowing the user to compare different helmets for sale in Moscow, including what each looks like, what that helmet is called and how much they cost, without leaving the SERP.

Further search results 930b through 930n presented in this example are composed of webpage links 966n and webpage descriptions 968n. Here, only two webpage links are displayed, but further links could be displayed on a SERP, including either non-repeating data segments as described in the present technology, or the webpage link and description combination as known in the art. In this example there has been no filter implemented on the SERP.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of constructing a search engine result page, the method executable at a server in communication with an electronic device via a communications network, the method comprising:
   receiving from the electronic device via the communications network, a search request;
   effecting a search in respect of the search request to yield search results, the search results including at least one webpage;
   identifying, by the search engine server, a repeating pattern of information of the at least one web page by analyzing the coding of the at least one web page;
   using the repeating pattern of information, retrieving at least one non-repeating data segment from within the at least one webpage;
   generating the search engine result page, the search engine result page including the at least one non-repeating data segment;
   sending a command signal to the electronic device via the communications network, the command signal being instrumental in causing the electronic device to execute displaying, to the user via a user output interface of the electronic device, (i) the search results including a link to at least one webpage and (ii) for at least one webpage, the non-repeating data segment in close proximity to the link; and
   wherein said retrieving at least one non-repeating data segment from within the at least one webpage comprises:
   using the repeating pattern of information, retrieving a plurality of non-repeating data segments from within the at least one webpage, at least some of the plurality of non-repeating data segments being at least partially different from others of the plurality of non-repeating data segments.

2. The method of claim 1, wherein the repeating pattern of information includes a repeating pattern of coding elements defining a coding template.

3. The method of claim 2, further comprising storing information representative of a structure of the coding template in a data store accessible to the server.

4. The method of claim 3, wherein analyzing the at least one webpage by the server to detect a repeating pattern of information within the at least one webpage, and
storing information representative of a structure of the coding template in a data store accessible to the server occur prior to receiving from the electronic device via the communications network, the search request, and generating the search engine result page.

5. The method of claim 1, wherein the command signal is further instrumental in causing the electronic device to display the search results, whereby the non-repeating pattern data segment replaces at least a portion of a description of the at least one webpage.

6. The method of claim 1, wherein generating the search engine results page includes ranking the search results by a ranking algorithm, the ranking algorithm assigning a higher ranking to the at least one webpage associated with a detected repeating pattern of elements.

7. The method of claim 1, the non-repeating data segment being non-repeating data segments, further comprising:
for at least one webpage having a detected repeating pattern of elements, receiving from the electronic device a filter request to filter the non-repeating data segments according to at least a portion of the non-repeating data;
effecting a second search in respect of the search request and the filter to yield second search results, the second search results including only those non-repeating data segments meeting the filter request;
generating a second search engine result page by the server; and
sending the second search engine result page to the electronic device.

8. The method of claim 1, further comprising:
for a plurality of webpages having a detected repeating pattern of elements, wherein the plurality of webpages contain a common type of non-repeating data segments, receiving a filter request from the electronic device to filter the non-repeating data segments according to at least a portion of the non-repeating data;
effecting a second search in respect of the search request and the filter to yield second search results by the server, the second search results including only those non-repeating data segments meeting the filter request;
generating a second search engine result page by the server; and
sending the second search engine result page to the electronic device.

9. The method of claim 1, wherein the non-repeating data segment includes pricing information.

10. The method of claim 1, wherein the non-repeating data segment includes images.

11. The method of claim 1, further comprising,
receiving a client pull request for the non-repeating data segments from the electronic device via the communications network; and
sending some of the non-repeating data segments of the at least one webpage to the electronic device.

12. A method of constructing a search engine result page viewable by a user of a electronic device, the method executable by the electronic device in communication with a server via a communication network, the method comprising:
receiving, from the user via a user input interface of the electronic device, a search request;
sending, to the server, the search request;
receiving, from the server, a search engine result page including search results in respect of the search request, the search results including at least one webpage having a repeating pattern of information within that webpage identified by the search engine server by analyzing the coding of the at least one webpage, and at least one non-repeating data segment retrieved using the repeating pattern of information; and
displaying, to the user via a user output interface, a list of links to at least some webpages being part of the search results, and, for the at least one webpage having the repeating pattern of elements, at least one non-repeating data segment of the at least one webpage, in proximity to the link to the at least one webpage; and
wherein retrieving the at least one non-repeating data segment from within the at least one webpage comprises:
using the repeating pattern of information, retrieving a plurality of non-repeating data segments from within the at least one webpage, at least some of the plurality of non-repeating data segments being at least partially different from others of the plurality of non-repeating data segments.

13. The method of claim 12, further comprising:
receiving, from the user via the user input interface, a filter request to filter the non-repeating data segments according to at least a portion of the non-repeating data;
sending, to the server, the filter request;
receiving, from the server, a second search engine result page including the non-repeating data segments corresponding to the filter request; and
displaying, to the user via the user output interface, the second search engine result page.

14. The method of claim 13, wherein
the filter request is in respect of multiple webpages, each of the multiple webpages having a detected repeating pattern of elements and having non-repeating data segments having a common type of non-repeating data;
sending the filter request to a host server hosting a one of the multiple webpages; and
receiving, from the host server hosting the one of the multiple webpages, non-repeating data segments corresponding to the filter request.

15. The method of claim 1, wherein the non-repeating data includes pricing information.

16. The method of claim 1, wherein the non-repeating data includes images.

17. The method of claim 1, further comprising,
sending, a client pull request for at least one non-repeating data segment to a host server hosting the at least one webpage; and
receiving, from the host server hosting the at least one webpage, the at least one non-repeating data segment of the at least one webpage.

18. A server comprising:
a communication interface for communication with an electronic device via a communication network; and
a processor operationally connected with the communication interface, the processor configured to:
receive, from the electronic device via the communication network, a search request;
effect a search in respect of the search request to yield search results, the search results including at least one webpage;
identify, by the search engine server, a repeating pattern of information of the at least one web page by analyzing the coding of the at least one web page;

using the repeating pattern of information, retrieve at least one non-repeating data segment from within the at least one webpage, the processor being configured to retrieve the at least one non-repeating data segment from within the at least one webpage by:
  using the repeating pattern of information, retrieving a plurality of non-repeating data segments from within the at least one webpage, at least some of the plurality of non-repeating data segments being at least partially different from others of the plurality of non-repeating data segments;
generate the search engine result page, the search engine result page including the at least one non-repeating data segment;
send a command signal to the electronic device via the communications network, the command signal being instrumental in causing the electronic device to execute; and
display, to the user via a user output interface of the electronic device, (i) the search results including a link to at least one webpage and (ii) for at least one webpage, the non-repeating data segment in close proximity to the link.

\* \* \* \* \*